(12) United States Patent
Simons

(10) Patent No.: US 11,147,242 B2
(45) Date of Patent: Oct. 19, 2021

(54) ANIMAL LEASH

(71) Applicant: The Pet Salon, Inc., Margate, NJ (US)

(72) Inventor: Charles Ross Simons, Margate, NJ (US)

(73) Assignee: THE PET SALON, INC.

( * ) Notice: Subject to any disclaimer, the term of this patent is extended or adjusted under 35 U.S.C. 154(b) by 238 days.

(21) Appl. No.: 16/392,276

(22) Filed: Apr. 23, 2019

(65) Prior Publication Data
US 2019/0320618 A1    Oct. 24, 2019

Related U.S. Application Data

(60) Provisional application No. 62/661,727, filed on Apr. 24, 2018.

(51) Int. Cl.
*A01K 27/00*    (2006.01)

(52) U.S. Cl.
CPC .......... *A01K 27/005* (2013.01); *A01K 27/003* (2013.01); *A01K 27/001* (2013.01)

(58) Field of Classification Search
CPC .... A01K 27/00; A01K 27/003; A01K 27/005; A01K 27/001
See application file for complete search history.

(56) References Cited

U.S. PATENT DOCUMENTS

| | | | |
|---|---|---|---|
| 5,003,930 A | 4/1991 | Shields | |
| 5,005,527 A * | 4/1991 | Hatfield | A01K 27/005 119/793 |
| 5,165,584 A * | 11/1992 | Meagher | A45F 3/14 124/88 |
| 5,732,660 A | 3/1998 | David et al. | |
| 5,749,325 A * | 5/1998 | Albanese | A01K 1/04 119/792 |
| 5,806,467 A | 9/1998 | Arakawa | |
| 6,675,742 B1 | 1/2004 | Shiraki | |
| 7,066,113 B2 | 6/2006 | Cheng et al. | |
| 8,267,050 B1 | 9/2012 | Hatecher et al. | |
| 8,365,685 B2 | 2/2013 | Simons | |
| 8,925,496 B2 * | 1/2015 | Simons | A01K 1/0613 119/856 |

(Continued)

FOREIGN PATENT DOCUMENTS

WO    WO 2015/175294    11/2015

OTHER PUBLICATIONS

International Search Report and Written Opinion for International Application No. PCT/US19/28731 dated Aug. 19, 2019.

(Continued)

*Primary Examiner* — Kristen C Hayes

(74) *Attorney, Agent, or Firm* — The Belles Group, P.C.

(57) ABSTRACT

An animal leash including a strap having a first end and a second end and a quick-release connector coupled to the strap. A first portion of the strap extends from the quick-release connector to the first end and a second portion of the strap extends from the quick-release connector to the second end. A locking member is coupled to the first and second portions of the strap to form a collar loop. The locking member may be alterable between: (1) a locked state in which a size of the collar loop is fixed; and (2) an unlocked state in which the size of the collar loop is adjustable.

18 Claims, 11 Drawing Sheets

(56) References Cited

U.S. PATENT DOCUMENTS

| | | | |
|---|---|---|---|
| 9,271,476 B1 | 3/2016 | Flynn | |
| 9,603,340 B2 | 3/2017 | Fletcher | |
| 10,070,702 B2 | 9/2018 | Daniel | |
| 10,349,705 B2* | 7/2019 | Daniel | .................... B63B 21/00 |
| 10,390,519 B2* | 8/2019 | Farrar | .................. A01K 27/001 |
| 2009/0071418 A1 | 3/2009 | Simons | |
| 2014/0224190 A1* | 8/2014 | Waters | ................. A01K 27/005 |
| | | | 119/863 |
| 2014/0331944 A1 | 11/2014 | Chrico | |
| 2015/0320012 A1* | 11/2015 | Simons | .................. A01K 13/00 |
| | | | 119/795 |
| 2016/0165849 A1 | 6/2016 | Lewis | |
| 2017/0127653 A1 | 5/2017 | Fang | |
| 2018/0008008 A1 | 1/2018 | Daniel | |
| 2018/0295947 A1* | 10/2018 | Daniel | ................. A01K 27/005 |
| 2020/0214260 A1* | 7/2020 | Beck | .................... A01K 27/003 |

OTHER PUBLICATIONS

Amazon.com: Mendota Pet Dog Slip Lead, 3/8" x6", Black : Pet Leashes: Pet Supplies, www.amazon.com, Mar. 20, 2019, pp. 1-10.
Amazon.com: Grand Line Reflective Climbing Rope Slip Lead Pets Lea . . . ium, Large and Extra Heavy Dogs and Cats—5th Ft Long: Pet Supplies, www.amazon.com, Apr. 5, 2018, pp. 1-5.
Harness Lead Dog Harness, Red Medium/Large—Chewy.com, www.chewy.com, Apr. 5, 2018, pp. 1-4.
Mendota Products Large Slip Solid Dog Lead, 6-ft, Tan—Chewy.com, www.chewy.com, Apr. 5, 2018, pp. 1-4.
Dogs & Co., Figure of 8 dogs lead, www.dogsandco.com, Apr. 5, 2018, pp. 1-3.

* cited by examiner

ANIMAL LEASH

CROSS-REFERENCE TO RELATED APPLICATION

The present application claims priority to U.S. Patent Application Ser. No. 62/661,727, filed Apr. 24, 2018, the entirety of which is incorporated herein by reference.

FIELD OF THE INVENTION

The present invention relates to leashes for animals, and particularly to leashes having an integral collar with a built-in safety feature to prevent choking or other physical harm or discomfort to the animal.

BACKGROUND OF THE INVENTION

Slip leads are an all too common type of leash that are used to maintain control of animals, and particularly pets such as dogs. The problem with a slip lead is that it is essentially the same as putting a slip knot around an animal's neck. Not only is this uncomfortable, it is potentially dangerous. A slip lead relies on tension alone to stay around a dog's neck. By relying solely on tension, a slip lead can: 1) unexpectedly loosen and become detached from the animal; and 2) tighten down very hard and very rapidly on an animal's neck, leading to potential soft tissue trauma, a collapsed trachea, and even vertebrae damage.

On the plus side, a slip lead is a very convenient type of leash that does not require the animal to be wearing a collar in order to use. Collars, when properly adjusted and used with an appropriate leash, have a significantly reduced risk of coming off or causing injury to an animal's neck as compared to a slip lead. However, a collar does need to be properly adjusted, and pet handlers who are not the owner of a dog cannot easily determine whether an animal's collar is too loose or too tight. It can often be time-consuming and/or difficult to adjust the size of a collar before attaching a leash, so that non-owner animal/pet handlers may choose to use a slip lead instead of attaching a leash to an animal's collar.

In view of the different drawbacks associated with a slip lead, on the one hand, and a collar and leash combination, on the other hand, there exists a need for an animal leash that has the convenience of a slip lead with the better safety of a collar and leash combination.

BRIEF SUMMARY OF THE INVENTION

The invention is directed to an animal leash including a strap having a first end and a second end and a quick-release connector coupled to the strap. A first portion of the strap extends from the quick-release connector to the first end and a second portion of the strap extends from the quick-release connector to the second end. A locking member is coupled to the first and second portions of the strap to form a collar loop. The locking member may be alterable between: (1) a locked state in which a size of the collar loop is fixed; and (2) an unlocked state in which the size of the collar loop is adjustable.

In one aspect, the invention may be an animal leash comprising: a strap comprising a first end and a second end; a quick-release connector coupled to the strap, a first portion of the strap extending from the quick-release connector to the first end and a second portion of the strap extending from the quick-release connector to the second end; a locking member coupled to the first and second portions of the strap to form a collar loop that is configured to be coupled to an animal; and wherein the locking member is alterable between: (1) a locked state in which the first and second portions of the strap are non-movable relative to the locking member and a size of the collar loop is fixed; and (2) an unlocked state in which at least one of the first and second portions of the strap is movable relative to the locking member while the locking member remains coupled to the first and second portions of the strap to adjust the size of the collar loop.

In another aspect, the invention may be an animal leash comprising: a strap forming a first loop having a fixed size at a first end portion of the strap for gripping by a user and a second loop having an adjustable size at a second end portion of the strap for being placed around a portion of an animal to couple the strap to the animal; a quick-release connector coupled to the strap along the second loop; and a locking member coupled to the strap at a location that is between the first and second loops, the location of the locking member along the strap determining the size of the second loop, the locking member being alterable between: (1) a locked state in which the locking member cannot move relative to the strap and the size of the second loop cannot be adjusted; and (2) an unlocked state in which the locking member can move relative to the strap while remaining coupled to the strap to adjust the size of the second loop.

In a further aspect, the invention may be an animal leash comprising: a first strap comprising a first end and a second end; a second strap comprising a first end and a second end, the second strap being distinct from the first strap; a quick-release connector coupled to the second end of the first strap and the first end of the second strap; a locking member coupled to the first and second straps to form a collar loop that includes a portion of the first strap, a portion of the second strap, and the quick-release connector, the collar loop being configured to be coupled to an animal; and wherein the locking member is alterable between: (1) a locked state in which a size of the collar loop is fixed; and (2) an unlocked state in which the first and second straps can slide relative to the locking member while the locking member remains coupled to the first and second straps to adjust the size of the collar loop.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

Figure 1A:
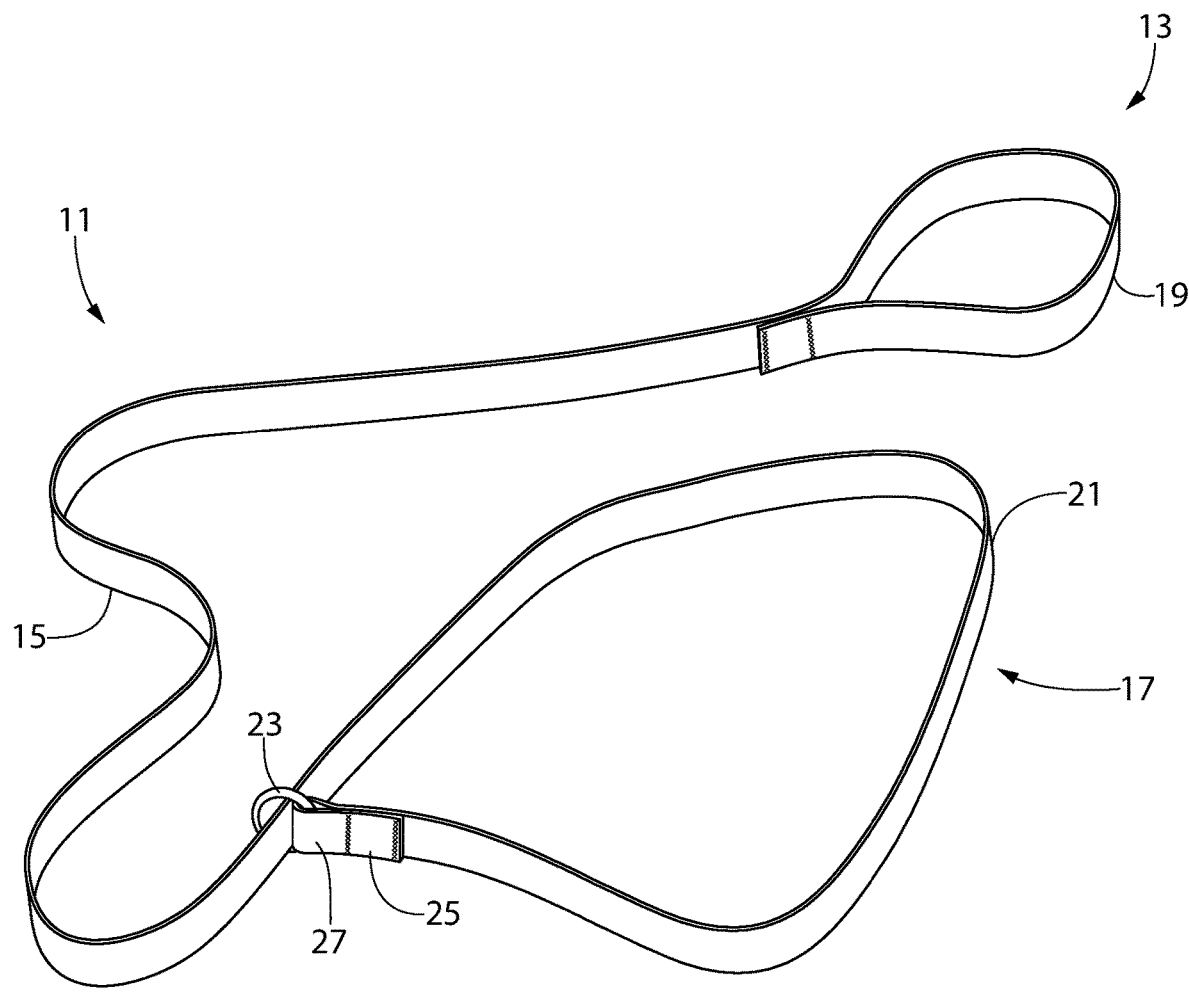
FIG. 1A is a perspective view of a slip lead in accordance with the prior art.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

FIG. 1A shows an example of a conventional slip lead 11, which are often formed from a webbing material. The slip lead 11 includes a first end 13, a middle portion 15, and a second end 17. At the first end 13, the webbing material is looped back and affixed to itself to form a hand loop 19. At the second end 17, the webbing material is looped back upon itself to form a neck loop 21. More specifically, the neck loop 21 is formed by passing part of the middle portion 15 through a ring 23 which is stitched into a tail end 25 of the webbing, which is looped back upon and affixed to itself to form a ring loop 27. As is known in the art, the middle portion 15 may freely slide through the ring 23 in order to increase or decrease the size of the neck loop 21. The size of the neck loop 21 is therefore freely adjustable to enlarge or constrict as tension is released or introduced by the user grasping the hand loop 21.

Figure 1B:
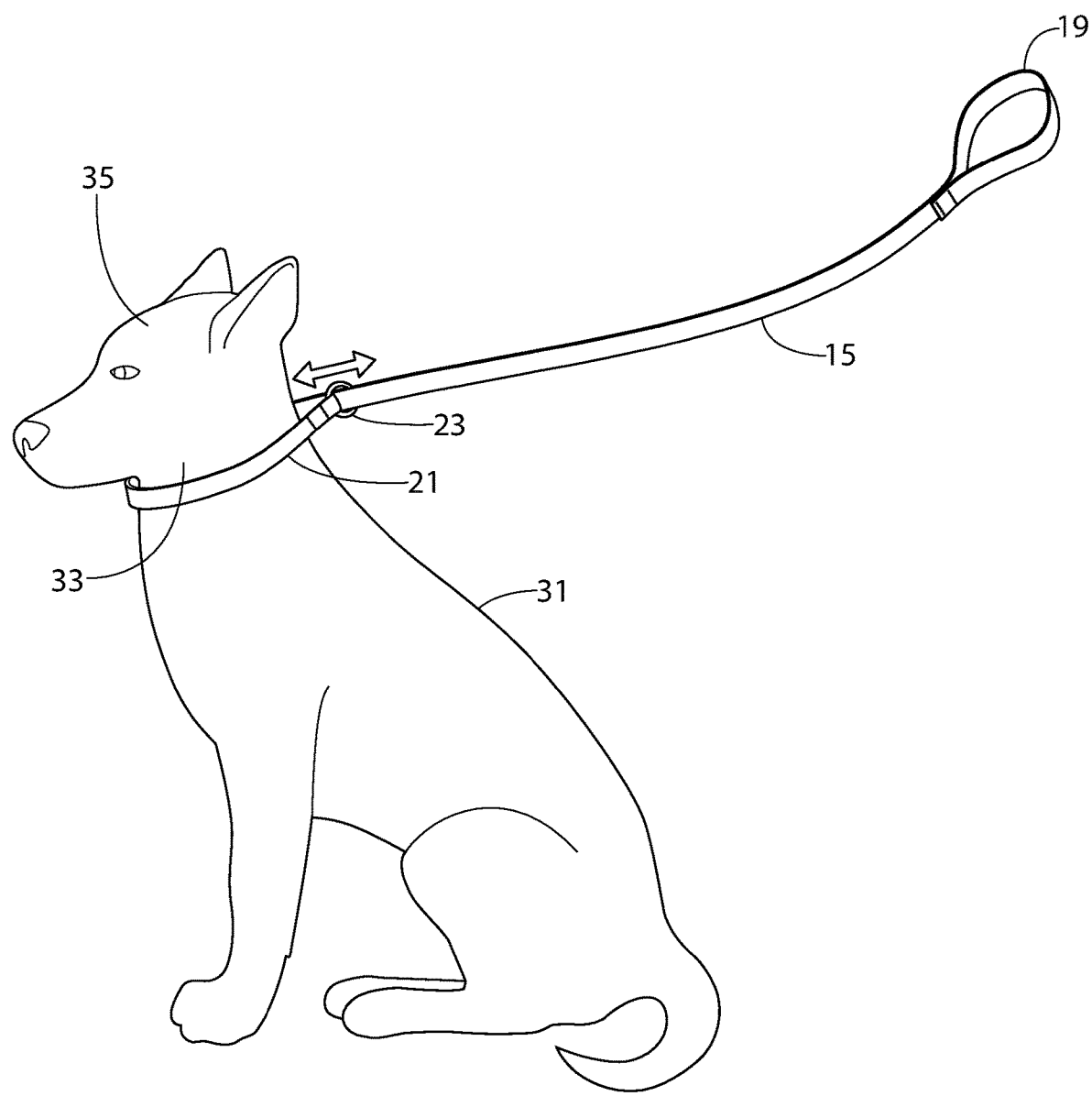
FIG. 1B illustrates the slip lead of FIG. 1A placed around the neck of a dog.

As shown in FIG. 1B, during use with a dog 31 (or other animal), the neck loop 21 is placed around the neck 33 of the dog 31. Since the middle portion 15 is free to slide through the ring 23, the neck loop 21 may constrict around the dog's neck 33 when tension is introduced into the middle portion 15 by the user pulling by the hand loop 19, which may occur when the dog 31 pulls during a walk. Conversely, the neck loop 21 may enlarge, even beyond the size of the dog's head 35, when tension is released in the middle portion 15. It is known that constriction of the neck loop 21 may cause injury to the dog 31, just as it is known that unanticipated enlarging of the neck loop 21 may allow the dog 31 to escape out of the slip lead 11. For example, tension may be introduced if the dog 31 suddenly decides to chase a squirrel or excitedly greet a person other than the user holding the lead. This tension may cause the neck loop 21 to tighten down very hard and very rapidly, which may result in injury to the dog 31. By way of another example, tension may be unexpectedly released when the user stops walking, the dog 31 stopping too, such that the user needs to consciously maintain tension in the middle portion 15 or else tension will release, thereby allowing the dog 31 to slip its head out of the neck loop 17.

Figure 2:
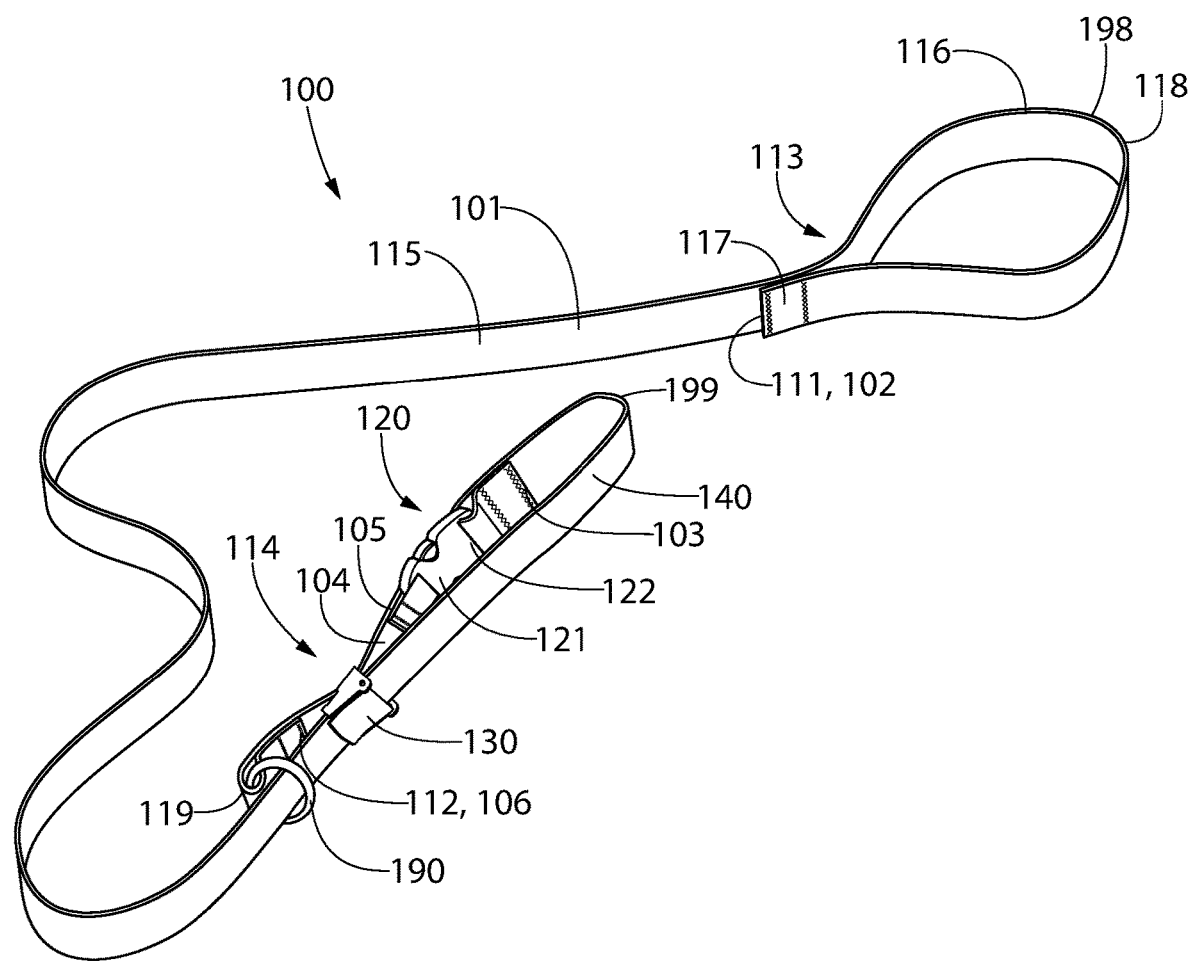
FIG. 2 is a perspective view of an animal leash in accordance with an embodiment of the invention.
Figure 3:
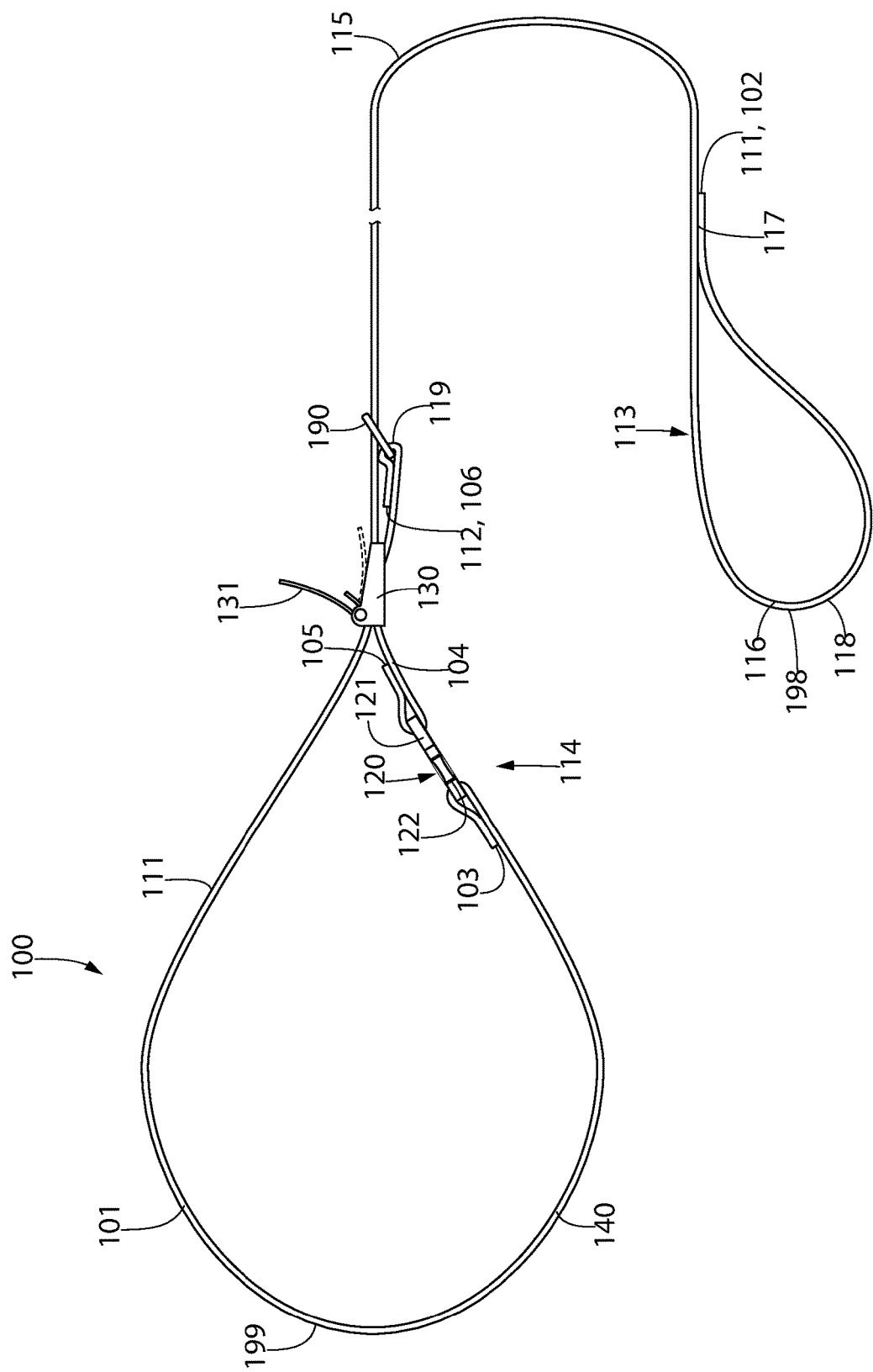
FIG. 3 is a top view of the animal leash of FIG. 2.

Referring now to FIGS. 2 and 3, an animal leash 100 will be described in accordance with an embodiment of the present invention. For purposes of this description, the animal leash 100 is illustrated being used with a dog, although those of skill in the art will recognize that the animal leash 100 may be used with any animal, whether a domesticated pet or other type of animal. The animal leash 100 comprises a strap 110 that extends from a first end 111 to a second end 112. It should be noted that the first and second ends 111, 112 of the strap 110 do not form the furthest-most extremities of the animal leash 100 because the strap 110 is folded over itself to from various loops and connection points for components thereof. Thus, as shown in the drawings the first and second ends 111, 112 of the strap 110 are not located at the furthest extremities of the animal leash 100, although they are the furthest extremities of the strap 110.

In the exemplified embodiment, the strap 110 comprises a first strap 101 comprising a first end 102 and a second end 103 and a second strap 104 comprising a first end 105 and a second end 106 such that the first end 102 of the first strap 101 forms the first end 111 of the strap 110 and the second end 106 of the second strap 104 forms the second end 112 of the strap 110. In other embodiments the strap 110 may be a singular continuous strap having various other components attached thereto as described herein. In some embodiments, the strap 110 will be described as having a first portion and a second portion, and such first and second portions may be equivalent to the first strap 101 and the second strap 104, respectively. In the exemplified embodiment, the strap 110 may be formed from a webbing material, although other materials may be used as alternatives, including rope, rubber, cotton, nylon, leather, and metal, to name a few.

The strap 110 comprises a first end portion 113 that comprises the first end 111 and a second end portion 114 that comprises the second end 112. The strap 110 is folded back upon itself along the first end portion 113 and the first end 111 of the strap 110 is coupled to the strap 110 along a middle portion 115 of the strap 110. In the exemplified embodiment, the first end 111 of the strap 110 is coupled to the middle portion 115 of the strap 110 by stitching, although other techniques can be used including staples, hardware, fasteners, adhesive, or the like. The first end 111 of the strap 110 may be coupled to the middle portion 115 of the strap 110 at a connection location 117, a secondary function of which will be described below. The coupling of the first end 111 of the strap 110 to the middle portion 115 of the strap 110 forms a grip loop 116 at the first end portion 113 of the strap 110.

In the exemplified embodiment, the grip loop 116 has a fixed size. Specifically, because the grip loop 116 is formed by stitching or otherwise permanently coupling the first end 111 of the strap 110 to the middle portion 115 of the strap 110, the size or diameter of the grip loop 116 cannot be changed or altered. The grip loop 116 has a predetermined size based upon the specific position of the connection location 117 at which the first end 111 is coupled or stitched to the middle portion 115. The grip loop 116 is the portion of the animal leash 100 that is intended to be gripped by a user during use of the animal leash 100. Specifically, during use a user will insert his/her fingers through the opening of the grip loop 116 and the user will then grip a part of the grip loop 116 by forming a closed first with the fingers extending through the grip loop 116. The proximal end of the grip loop 116 forms a proximal-most end 198 of the animal leash 100.

The animal leash 100 comprises a quick-release connector 120 that is coupled to the strap 110 at a location that is closer to the second end 112 of the strap 110 than to the first end 111 of the strap 110. Specifically, the quick-release connector 120 may be approximately 45 inches away from the proximal-most end 118 of the grip loop 116 and approximately 3.5 inches away from the distal-most end 119 of the strap 110. Thus, a ratio of a distance from the quick-release connector to the proximal-most end 118 of the grip loop 116 to the distance from the quick-release connector 120 to the distal-most end 119 of the strap 110 may be between 8:1 and 15:1, or between 10:1 and 16:1, more specifically between 11:1 and 15:1, more specifically between 12:1 and 14:1, and more specifically between 12.5:1 and 13.5:1. Thus, the quick-release connector 120 is positioned much closer to the distal-most end 119 of the strap 110 than the proximal-most end 118 of the grip loop 116 and also much closer to the second end 112 of the strap 110 than to the first end 111 of the strap 110. In the exemplified embodiment, the quick-release connector 120 is a side-release buckle. However, the invention is not to be so limited in all embodiments and the quick-release connector 120 can take on other structural forms, such as being a front release buckle, any other style buckle, a clasp such as but not limited to a squeeze clasp, or the like. The quick-release connector 120 may be formed from a hard plastic material, metal, rubber, or the like.

In the exemplified embodiment, the quick-release connector 120 comprises a male portion 121 and a female portion 122. In the exemplified embodiment, the male portion 121 is coupled to the first end 105 of the second strap 104 and the female portion 122 is coupled to the second end 103 of the first strap 101. However, the invention is not to be so limited and in other embodiments the male portion 121 may be coupled to the second end 103 of the first strap 101 while the female portion 122 is coupled to the first end 105 of the second strap 104. The strap 110 comprises a first portion (which may be the first strap 101) that extends from the quick-release connector 120 to the first end 111 of the strap 110 and a second portion (which may be the second strap 104) that extends from the quick-release connector 120 to the second end 112 of the strap 110.

At the location at which the male and female portions 121, 122 of the quick-release connector 120 is coupled to the first and second straps 101, 104, the first and second straps 101, 104 are folded and stitched to themselves to form quick-release connector loops that facilitate the coupling of the first and second straps 101, 104 to the male and female portions 121, 122 of the quick-release connector 120. Specifically, the second end 103 of the first strap 101 is passed through an opening in the female portion 122 of the quick-release connector 120 and then stitched to itself to couple the first strap 101 to the female portion 122 of the quick-release connector 120. Similarly, the first end 105 of the second strap 104 is passed through an opening in the male portion 121 of the quick-release connector 120 and then stitched to itself to couple the second strap 104 to the male portion 121 of the quick-release connector 120. As discussed further below, the quick-release connector 120 can be in an attached state whereby the first and second straps 101, 104 are coupled to one another via the quick-release connector 120 and a detached state whereby the first and second straps 101, 104 are not attached to one another (at least not at their ends, although they may be coupled together elsewhere via a locking member as described below).

As mentioned above, the first portion of the strap 110, which is also referred to herein as the first strap 101, extends from the quick-release connector 120 to the first end 111 of the strap 110. The second portion of the strap 110, which is also referred to herein as the second strap 104, extends from the quick-release connector 120 to the second end 112 of the strap 110. In the exemplified embodiment the first and second straps 101, 104 are separate and distinct straps of webbing materials, although in other embodiments they can be portions of the same strap. In the exemplified embodiment, the first strap 101 (or the first portion of the strap 110) has a first length and the second strap 104 (or the second portion of the strap 110) has a second length, the first length being greater than the second length. In some embodiments, the first length may be between 40 inches and 50 inches, and more specifically approximately 35 inches and the second length may be between 3 inches and 4 inches. In some embodiments, a ratio of the first length to the second length may be in a range of 8:1 to 17:1, and more specifically 10:1 to 14:1.

Figure 7:
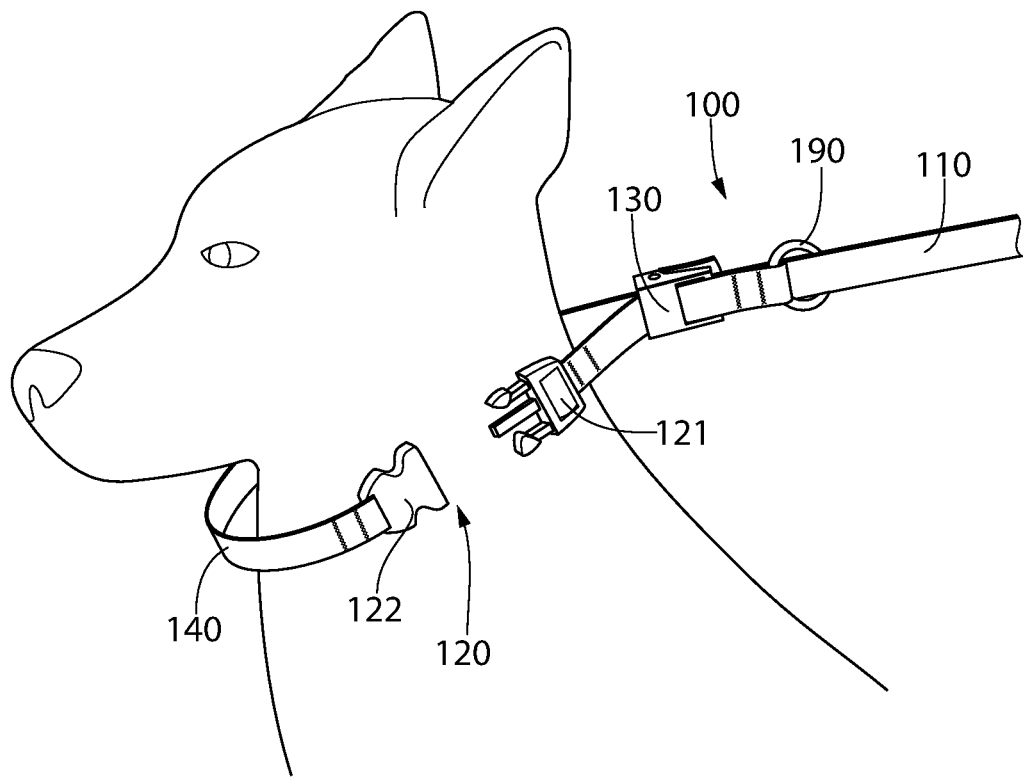
FIG. 7 illustrates the animal leash of FIG. 2 placed around the neck of the animal with a quick-release connector thereof in a detached state so that the animal leash can be removed from the neck of the animal.

The quick-release connector 120 is alterable between an attached state, as shown in FIGS. 2 and 3, wherein the male connector 121 is coupled to the female connector 122, and a detached state, as shown in FIG. 7, wherein the male connector 121 is not coupled to the female connector 122. The function and purpose of the quick-release connector 120 will be described in greater detail below, but generally it can be altered into the detached state to remove the animal leash 100 from an animal to which it is attached without changing a size of a loop portion of the strap 110 that is placed around the animal's neck or body.

In the exemplified embodiment, a ring 190 is coupled to the strap 110 at the second end 112 of the strap 110. Specifically, the second end 112 of the strap 110 is passed through an opening of the ring 190 and then coupled back to the strap 110 to securely couple the ring 190 to the strap 110. In use, the grip loop 116 and other portions of the first strap 101 may be passed through the ring 190 similar to the operation of the slip lead 11 of the prior art as described above and illustrated in FIGS. 1A and 1B. In fact, the first strap 101 is illustrated being passed through the ring 190 in FIGS. 2 and 3 such that the ring 190 surrounds a part of the first strap 101. However, the first strap 101 need not be passed through the ring 190 in all embodiments during use. Specifically, in the prior art slip lead 11, the passing of the strap through the ring 23 is what forms the loop that is placed around the animal's neck or body during use. In the exemplified embodiment, the ring 190 does not play any role in the formation of the loop that is placed around the animal's neck or body. However, the ring 190 does have a function and it will be described in greater detail below.

The animal leash 100 also comprises a locking member 130. The locking member 130 is coupled to the first and second straps 101, 104 (i.e., the first and second portions of the strap 110) to form a collar loop 140 that is configured to be placed around a neck or body of an animal. Thus, in this embodiment, the locking member 130 forms and dictates the size of the collar loop 140 rather than the ring 190 as with the prior art embodiments.

The locking member 130 is coupled to the first strap 101 between the first and second ends 102, 103 thereof and to the second strap 104 between the first and second ends 105, 106 thereof. However, the exact location of the locking member 130 along the first and second straps 101, 104 is not fixed and can be modified by moving the locking member 130 relative to the first and/or second straps 101, 104 when the locking member 130 is in an unlocked state, as described further herein. Thus, when in the unlocked state, the locking member 130 is movable along the first and second straps 101, 104 (or the first and/or second straps 101, 104 are movable relative to the locking member 130) to adjust a size or diameter of the collar loop 140. The locking member 130 can then be locked (altered from the unlocked state into an locked state) at any location along the first and second straps 101, 104 to prevent further adjustment of the size of the collar loop 140. Thus, the size of the collar loop 140 is dictated by the specific location along the first and/or second straps 101, 104 at which the locking member 130 is positioned at any given time. The further the locking member 130 is from the quick-release connector 120, and particularly the portion of the quick-release connector 120 that is connected to the first strap 101, the greater the size of the collar loop 140. Generally, the first strap 101 is moved relative to the locking member 130 to adjust the size of the collar loop 140 because the first strap 101 is much longer than the second strap 104, but the second strap 104 can also be moved relative to the locking member 130 to create small adjustments in the size of the collar loop 140.

In the exemplified embodiment, the locking member 130 is a cam buckle and it is formed from metal such as for example without limitation stainless steel. However, the invention is not to be so limited in all embodiments. In other embodiments, the locking member 130 may be a cam buckle formed from plastic. In still other embodiments, the locking member 130 may be other structures that are capable of adjusting the size of the collar loop 140 as described herein. For example, in one embodiment the locking member 130 may comprise one or more protrusions on one of the first and second straps 101, 104 and apertures in the other one of the first and second straps 101, 104, the apertures being configured to receive the protrusions. In such an embodiment, the first and second straps 101, 104 may be moved relative to one another and then locked in place by inserting the one or more protrusions into corresponding ones of the apertures. In other embodiments, the locking member 130 may be a clamp, a latch, a cord lock such as for example without limitation a spring-actuated cord lock, a tie member, or the like.

As mentioned above, the locking member 130 is alterable between: (1) a locked state in which the locking member 130 is non-movable relative to the first and second portions of the strap 110 (i.e., the first and second straps 101, 104); and (2) an unlocked state in which the locking member 130 is movable relative to at least one, or possibly both, of the first and second portions of the strap 110 (i.e., the first and second straps 101, 104). Thus, when the locking member 130 is in the locked state, the size (diameter, etc.) of the collar loop 140 is fixed and cannot be modified. When the locking member 130 is in the unlocked state, the size (diameter, etc.) of the collar loop can be modified (increased/decreased) by sliding the locking member 130 relative to the first and/or second straps 101, 104. Thus, the animal leash 100 functions similarly to a traditional slip lead except that the collar portion can be locked into a specific size rather than it being constantly alterable by changing the tension on the leash.

In the exemplified embodiment, the locking member 130 stays in whichever state it is in until a user physically alters the locking member 130 into the other state. Thus, if the locking member 130 is in the locked state, the locking member 130 will remain in the locked state until a user physically interacts with the locking member 130 to alter it into the unlocked state. Similarly, if the locking member 130 is in the unlocked state, the locking member 130 will remain in the unlocked state until a user physically interacts with the locking member 130 to alter it into the locked state. This is important in some embodiments because it enables the size of the collar loop 140 to be adjusted at any time that the locking member 130 is in the unlocked state without requiring the user to apply constant pressure onto the locking member 130.

In the exemplified embodiment, the locking member 130 comprises an actuator arm 131 that is adjusted between an up-position (shown in solid lines in FIG. 3) and a down-position (shown in phantom lines in FIG. 3). The up-position of the actuator arm 131 is the unlocked state of the locking member 130 and the down-position of the actuator arm 131 is the locked state of the locking member 130. Of course, the exact structure of the locking member 130 is not to be limiting of the present invention in all embodiments and it is dependent on the exact type of device used.

Although the locking member 130 is movable relative to the first and second straps 101, 104 (at least when it is in the unlocked state), the locking member 130 is generally prevented from becoming detached from either one of the first and second straps 101, 104 without an intentional act being performed by the user. Specifically, the connection location 117 at which the first end 102 of the first strap 101 is stitched to itself acts as a stopper that prevents the locking member 130 from sliding past the first end 102 of the first strap 101 during normal use. This is because the thickness of the strap 110 is increased at the connection location 117 due to the strap 110 having been folded onto itself. The locking member 130 is prevented from being slid past the second end 103 of the first strap 101 due to the female portion 122 of the quick-release connector 120. Specifically, the locking member 130 is unable to slide past the female portion 122 of the quick-release connector 120. Thus, the locking member 130 is able to move or slide along the first strap 101 between the female portion 122 of the quick-release connector 120 and the connection location 117.

Similarly, the locking member 130 is prevented from being slid off the second strap 104 due to the male portion 121 of the quick-release connector 120 and the ring 190. Thus, the locking member 130 is movable or slidable along the second strap 104 between the male portion 121 of the quick-release connector 120 and the ring 190 (or portions of the second strap 104 that are folded onto itself to couple those components thereto). Thus, the ring 190, the male and female portions 121, 122 of the quick-release connector 120, and the connection location 117 form stoppers that prevent the locking member 130 from becoming detached from the first and second straps 101, 104. It should be appreciated that the locking member 130 is coupled to both of the first and second straps 101, 104 regardless of the position of the locking member 130 therealong, regardless of the size of the collar loop 140, and regardless of whether the locking member 130 is in the locked state or the unlocked state.

Thus, a portion of each of the first and second straps 101, 104 is always located on opposing sides of the locking member 130. Specifically, a portion of the first strap 101 that includes the grip loop 116 and a portion of the second strap 104 that includes the distal end 106 as well as the ring 190 are located on one side of the locking member 130 while a portion of the first strap 101 and a portion of the second strap 104 that form the collar loop 140 are located on an opposite side of the locking member 130. Thus, the locking member 130 divides the animal leash 100 into the collar loop 140 which is attached to the animal and the remainder which extends from the animal to the user when the user is gripping the grip loop 116. Thus, portions of both of the first and second straps 101, 104 are located on both opposing sides of the locking member 130. The locking member 130 does not really form a part of the collar loop 140 in the exemplified embodiment, but rather is positioned immediately outside of it.

It should be noted that the collar loop 140 is only formed into a closed loop when the quick-release connector 120 is in the attached state. When the quick-release connector 120 is in the detached state, the collar loop 140 is open and does not form a closed loop. However, when the quick-release connector 120 is in the detached state and the collar loop has been pre-adjusted to be the appropriate size for a particular animal, the animal leash 100 can be easily attached to an animal in the exact same manner as a traditional collar by simply wrapping the portion of the strap 110 that forms the collar loop 140 around the animal's neck or body and then attaching the two pieces of the quick-release connector 120 to alter the quick-release connector into the attached state. When the quick-release connector 120 is in the detached state, the first and second straps 101, 104 are coupled together solely by the locking member 130.

As noted above, it is the locking member 130, and specifically the location/position thereof, that forms and dictates the size of the collar loop 140. Specifically, because the locking member 130 is always coupled to both the first strap 101 and the second strap 104, whenever the quick-release connector 120 is in the attached state the collar loop 140 exists as a closed loop. The locking member 130 is coupled to both of the first and second straps 101, 104 by folding or bending the first and/or second straps 101, 104 until one of the first or second straps 101, 104 overlies the other of the first and/or second straps 101, 104. The locking member 130 is coupled to the first and second straps 101, 104 at the location at which they overlie one another. Generally, when moving the first strap 101 relative to the locking member 130, the first strap 101 is also moving relative to the second strap 104 to modify the size of the collar loop 140. As noted above, moving or sliding the locking member 130 relative to the first and/or second straps 101, 104 adjusts the size of the collar loop 140. For example, if the locking member 130 is in the unlocked state and the first strap 101 is pulled in the direction of the first end 102 of the first strap 101, the collar loop 140 will decrease in size. If the locking member 130 is in the unlocked state and the first strap 101 is pulled in the direction of the second end 103 of the first strap 101, the collar loop will increase in size.

The collar loop 140 also comprises a portion of the first strap 101, a portion of the second strap 104, and the quick-release connector 130.

Figure 4:
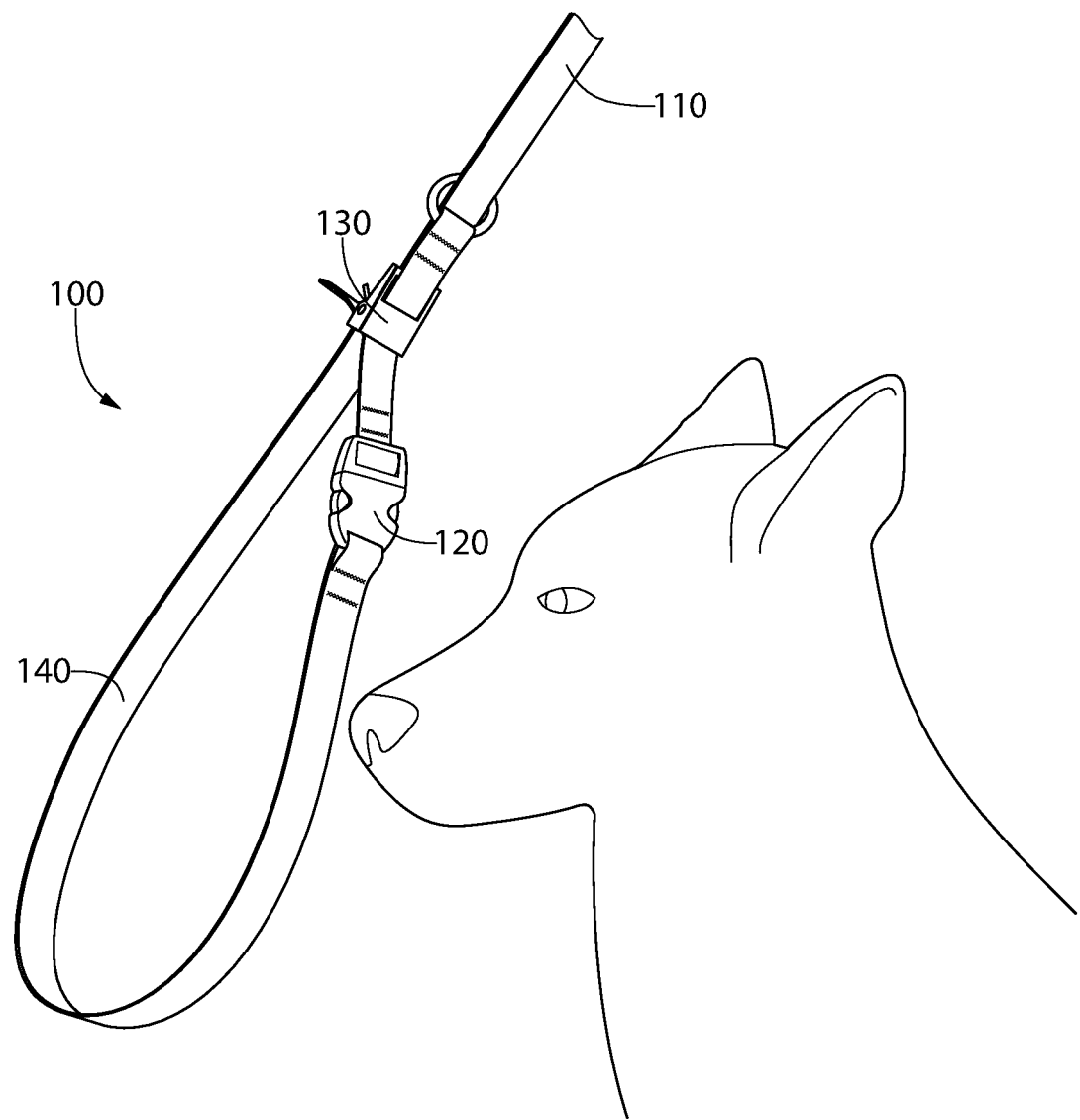
FIG. 4 illustrates the animal leash of FIG. 2 in preparation for being placed around a neck of an animal.

Referring to FIGS. 4-7 in succession, use of the animal leash 100 will be described in accordance with a first embodiment of the present invention. Specifically, FIGS. 4-7 illustrate use of the animal leash 100 such that the animal leash 100 is attached to the neck of the animal. In other embodiments, the animal leash 100 may be attached around the body of the animal at locations other than the neck to enhance the safety and further prevent choking or discomfort to the animal. First, as shown in FIG. 4, the animal leash 100 is held up near the animal with the collar loop 140 adjacent to the animal's head so that the animal's head can be inserted into and through the collar loop 140. During this process, the locking member 130 is in the unlocked state. Thus, if the collar loop 140 is too small, as the user places the collar loop 140 over the animal's head, the collar loop 140 will automatically increase in size in order to fit over the animal's head.

Figure 5:
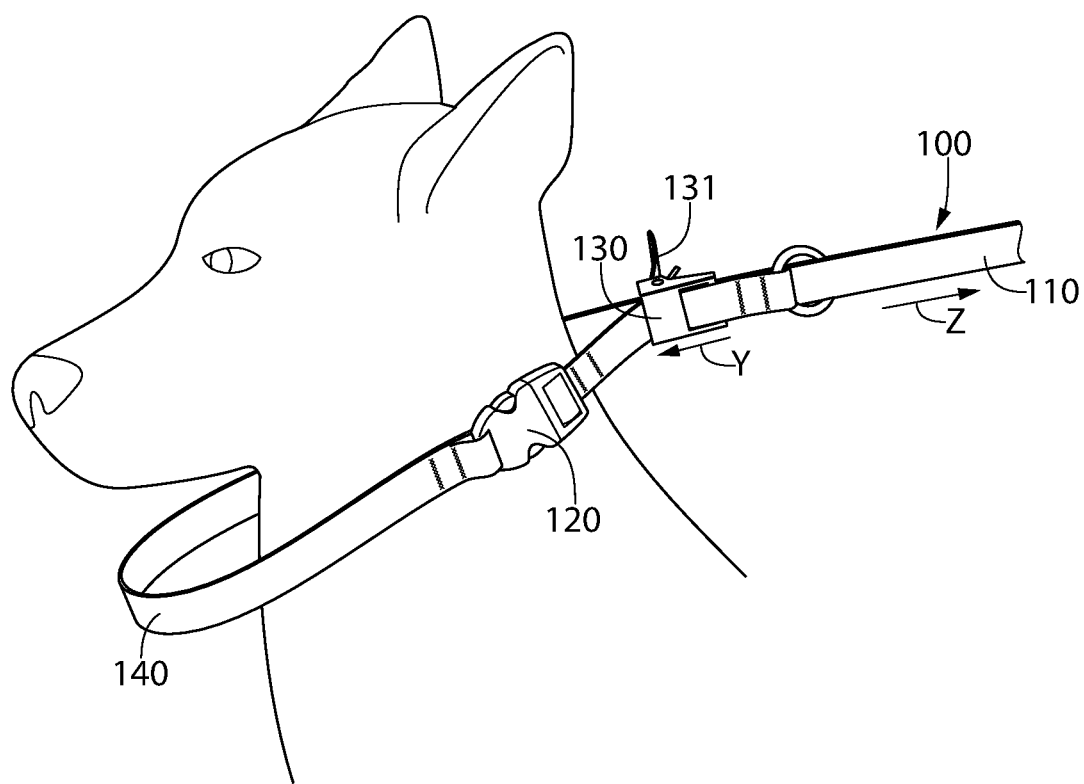
FIG. 5 illustrates the animal leash of FIG. 2 placed around the neck of the animal with a locking member thereof in an unlocked state so that a size of a collar loop that is fit around the neck of the animal can be adjusted.

Referring to FIG. 5, once the collar loop 140 is positioned around the animal's neck, the size of the collar loop 140 can be adjusted until a proper fit on that particular animal is achieved. Specifically, because the locking member 130 remains in the unlocked state, the user can decrease the size of the collar loop 140 by pulling on the strap 110 in a first direction Z and the user can increase the size of the collar loop 140 by pulling on the strap 110 in a second direction Y. The user should adjust the size of the collar loop 140 until the user is satisfied with the size of the collar loop 140, which should generally be large enough so that a user can fit two fingers in between the collar loop 140 and the animal's neck.

Figure 6:
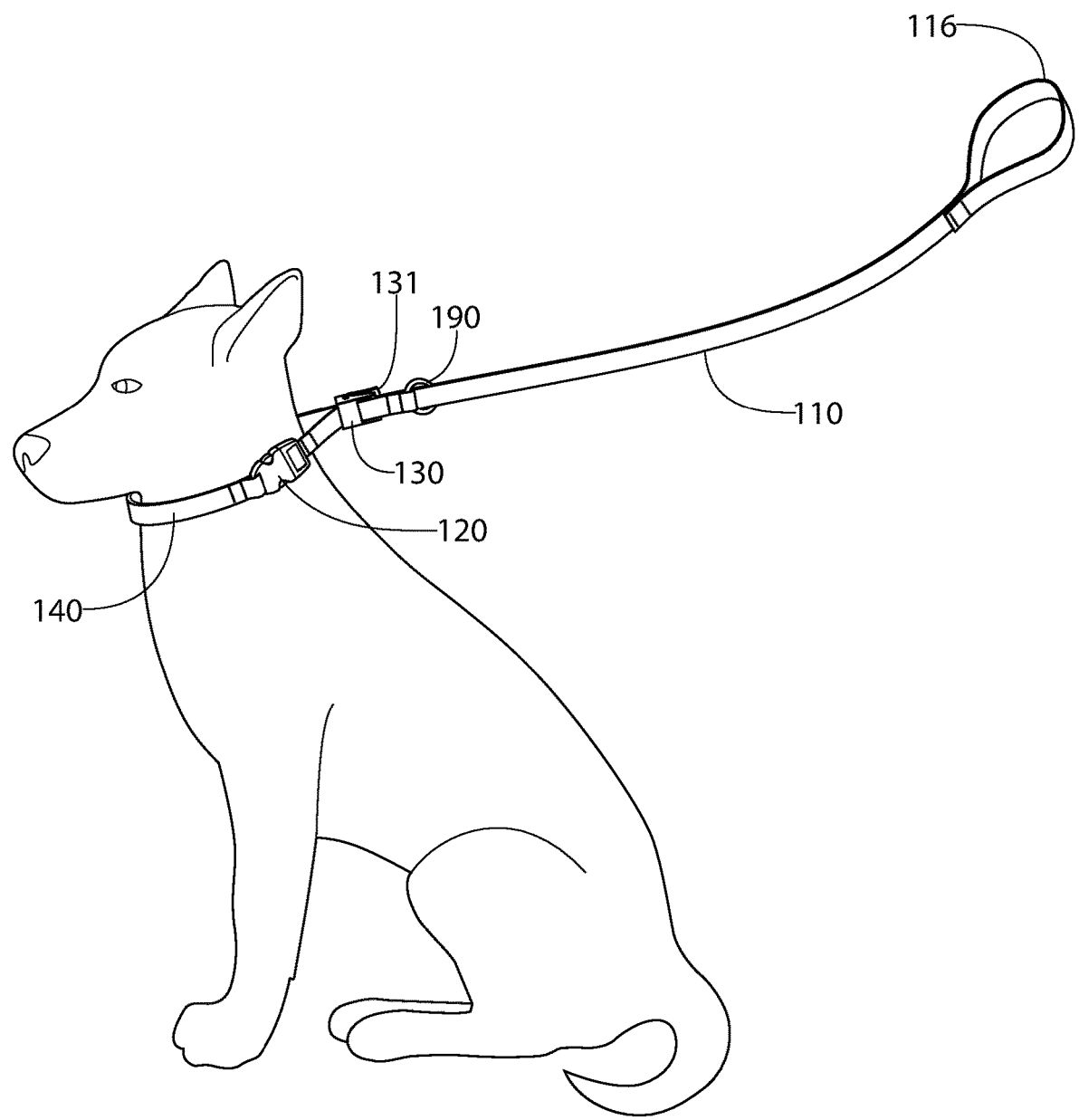
FIG. 6 illustrates the animal leash of FIG. 2 placed around the neck of the animal with the locking member thereof in a locked state so that the size of the color loop that is fit around the neck of the animal cannot be adjusted.

Referring to FIG. 6, once the collar loop 140 is at the desired size, the locking member 130 is altered from the unlocked state depicted in FIG. 5 to the locked state depicted in FIG. 6. In the exemplified embodiment, the locking member 130 is a cam buckle and altering the cam buckle from the unlocked state to the locked state is achieved by clamping down the actuator arm 131. However, depending on the structure of the locking member 130, this can be achieved in various different ways, some of which have been described above. The cam buckle is a preferred structure for the locking member 130 because it allows relative movement between the locking member 130 and the strap 110 in the unlocked state without any action required by the user. For example, if the locking member 130 were a cord lock, the user would have to press an actuator to alter the locking member into the unlocked state and would have to continue pressing the actuator during all adjustments of the size of the collar loop 140. Thus, because such a cord lock is biased into a locked state, adjustments require more user involvement than with the cam buckle embodiment. When the cam buckle is in the unlocked state, it freely and readily moves/slides relative to the strap 119 when tension is applied to the strap 110 in either direction, which makes it very easy to adjust the size of the collar loop 140.

At any rate, once the locking member 130 is altered into the locked state as shown in FIG. 6, the size of the collar loop 140 can no longer be adjusted without first altering the locking member 130 back into the unlocked state. Thus, if a user were to pull on the strap 110 in any direction while the locking member 130 is in the locked state, the size of the collar loop 140 will not change. This is important because it prevents injury and serious discomfort to the animal which occurs in the prior art slip leads as noted above. It also prevents the animal leash 100 from becoming detached from the animal because the collar loop 140 will not enlarge to the point of being removed over the animal's head without the size of the collar loop 140 first being adjusted, which requires altering the locking member 130 from the locked state to the unlocked state. In the exemplified embodiment, even though the animal leash 100 includes a lead and a collar in one, the collar size can become fixed when the locking member 130 is in the locked state.

Finally, referring to FIG. 7, removal of the animal leash 100 from the animal will be described. If the collar loop 140 is sized properly for a particular animal, it cannot be removed from the animal by just pulling it over the animal's head. One way that the animal leash 100 can be removed from the animal is to alter the locking member 130 from the locked state back into the unlocked state, to increase the size of the collar loop 140, and then pull the collar loop 140 back over the animal's head. However, this is time consuming and undesirable because the user would have to readjust the size of the collar loop 140 every time it is put onto the animal.

For this reason, in the exemplified embodiment the quick-release connector 120 is located along the collar loop 140. Thus, when it is time to remove the animal leash 100 from the animal, the user can simply alter the quick-release connector 120 into the detached state in the traditional way. This will open the collar loop 140 so that the animal leash 100 can be easily removed from the animal in the same way that traditional or conventional collars are removed from an animal. Furthermore, when it is desired to put the animal leash 100 back on the dog, the user simply wraps the two sides of the collar loop 140 around the animal's neck and then reconnects the quick-release connector 120. The collar loop 140 will have maintained its size which has already been adjusted to be appropriate for the particular animal with which it is being used. This simplifies the process of attaching the animal leash 100 back onto the dog in a manner that is safer than those used in the prior art. Of course, it should be appreciated that in some embodiments the quick-release connector 120 may be omitted.

Figure 8:
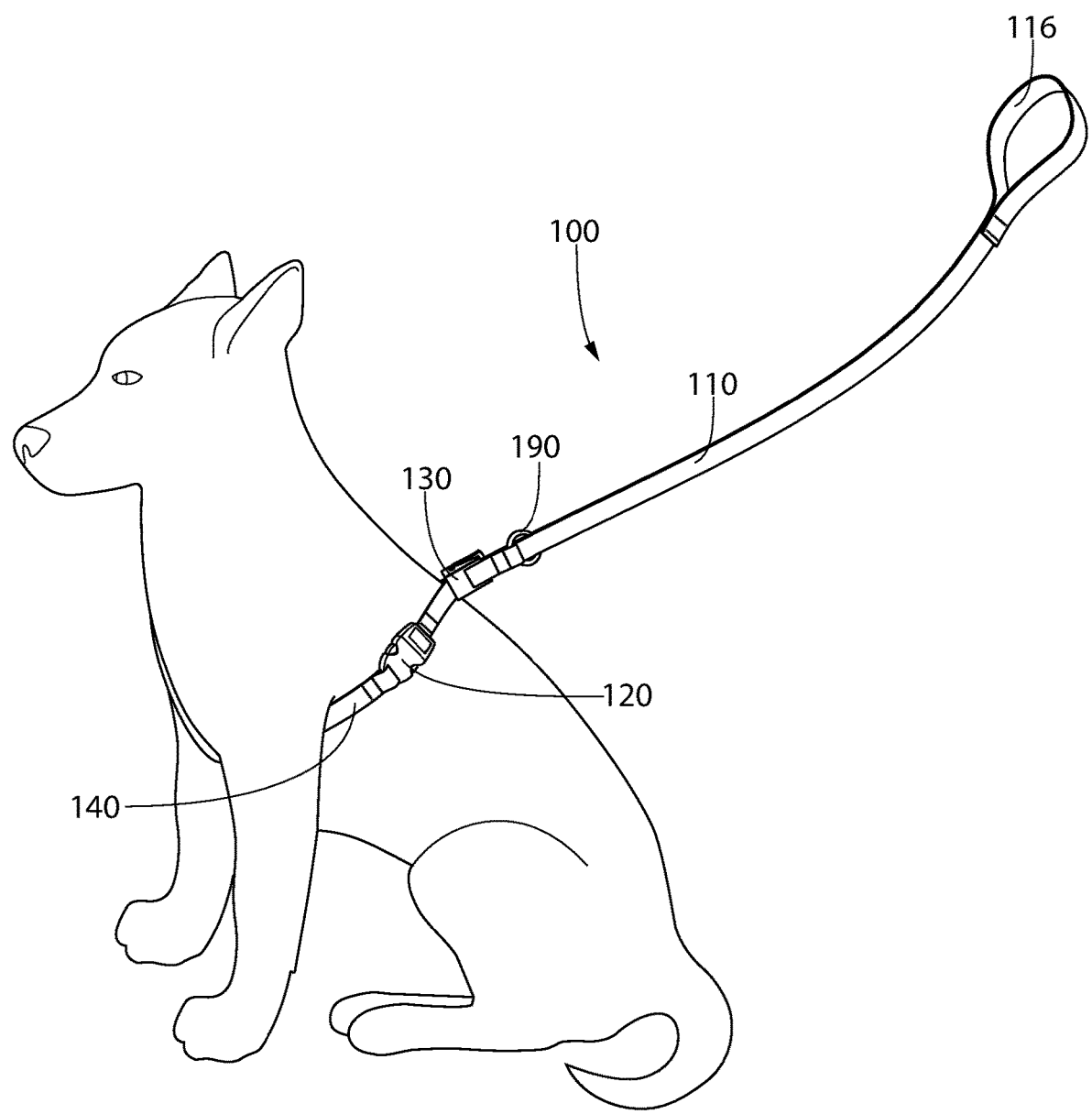
FIG. 8 illustrates the animal leash of FIG. 2 placed around a body of the animal in a half-harness configuration.

Referring to FIG. 8, the animal leash 100 is illustrated coupled to the animal in a different manner. As described above, attached any leash around an animal's neck can cause discomfort to the animal or even choking. Thus, in FIG. 8 the same exact animal leash 100 described above is attached around the body of the animal rather than around the neck. To do this, the collar loop 140 is enlarged so that it can fit around the animal's body, which is larger than its neck. The collar loop 140 is then placed over one shoulder and under the opposite front leg. Once properly sized, the locking member 130 is altered into the locked state as has been described above. Now, when desired to remove the animal leash 100 from the animal, a user can alter the quick-release connector 130 into the detached state. A user can then easily re-attach the animal leash 100 to the animal in the same manner by wrapping the animal leash 100 around the animal's body as shown in FIG. 8 and then altering the quick-release connector 130 back into the attached state. This manner of attaching the animal leash 100 to the animal may be referred to as a half-harness. The half-harness does not go around the neck of the animal at all, but it still restrains the animal. It may be preferable to wrap the animal leash 100 around the animal using this technique if the animal has a pre-existing breathing or trachea issue which makes it undesirable to have anything circling the neck or if the animal is a Brachycephalic breed (one which has a short nose and flat face), which by nature has a difficult time breathing.

Figure 9A:
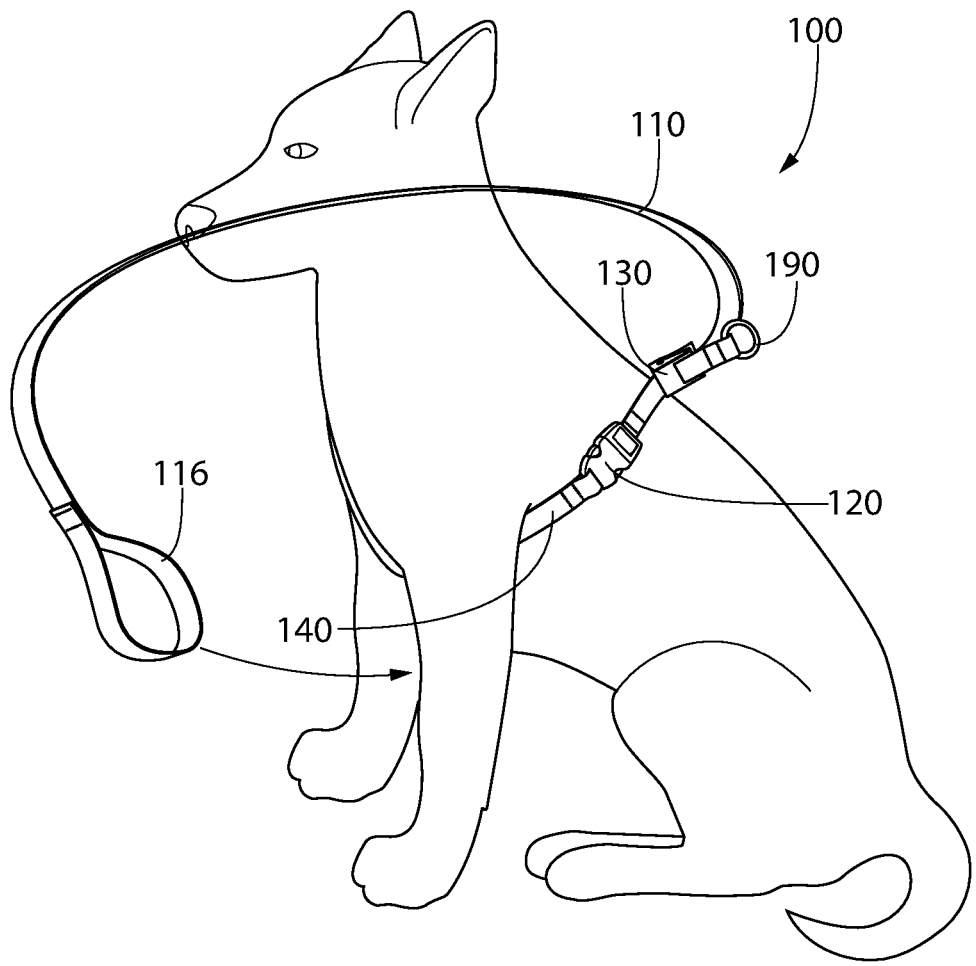
FIG. 9A illustrates the animal leash of FIG. 2 being converted from the half-harness configuration to a full harness configuration.
Figure 9B:
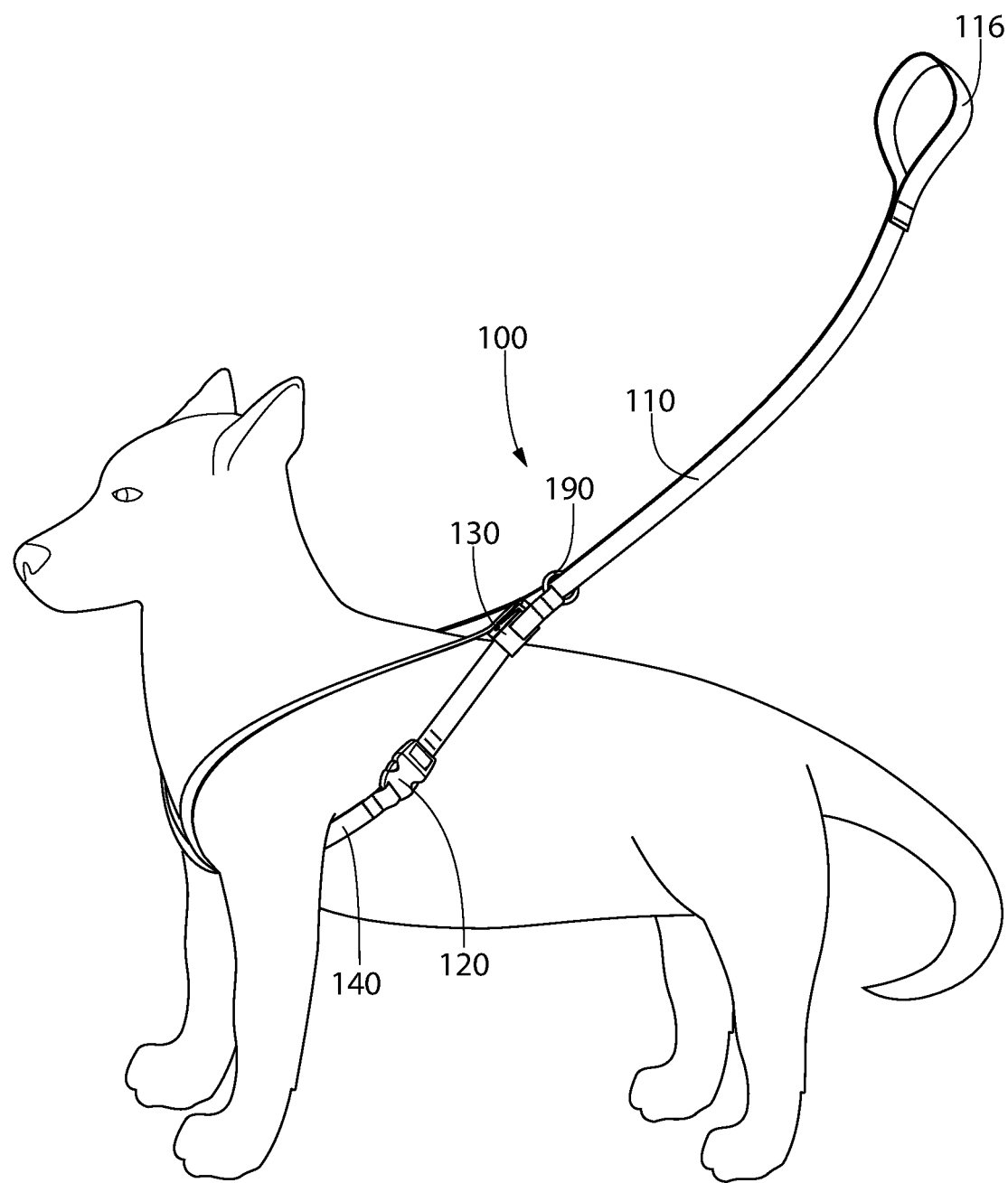
FIG. 9B illustrates the animal leash of FIG. 2 placed around the body of the animal in a full harness configuration.

FIGS. 9A and 9B illustrate yet another technique with which the animal leash 100 described herein can be attached to an animal. The technique in FIGS. 9A and 9B is more similar to a full harness whereby a FIG. 8 is created with the animal leash 100 to complete a more complete harness. The set-up is the same as the half-harness. Once in the half-hardness position as shown in FIG. 9A, the user then takes the free end of the animal leash 100 and duplicates the loop under the other leg and over the other shoulder. Specifically, if the half-harness is over the right shoulder and under the left leg, the user takes the free end of the animal leash 100, wraps it over the left shoulder, wraps it under the right leg, and then extends the free end of the animal leash 100 through the ring 190. The length of the strap 110 may need to be increased to accommodate animals of different size, particularly big, barrel chested animals/dogs. Thus, there is a bit of versatility in terms of the manner in which the animal leash 100 described herein can be used to secure and walk/control an animal.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An animal leash comprising:
    a strap comprising a first end and a second end;
    a quick-release connector coupled to the strap, a first portion of the strap extending from the quick-release connector to the first end and a second portion of the strap extending from the quick-release connector to the second end;
    a locking member coupled to the first and second portions of the strap to form a collar loop that is configured to be coupled to an animal; and
    wherein the locking member is alterable between: (1) a locked state in which the first and second portions of the strap are non-movable relative to the locking member and a size of the collar loop is fixed; and (2) an unlocked state in which at least one of the first and second portions of the strap is movable relative to the locking member while the locking member remains coupled to the first and second portions of the strap to adjust the size of the collar loop;
    wherein a second end portion of the strap that comprises the second end of the strap is always located outside of the collar loop;
    wherein a length of the second end portion of the strap is adjustable when the locking member is in the unlocked state by moving the locking member towards and away from the second end of the strap; and
    further comprising a ring coupled to the second end of the strap, a portion of the first portion of the strap that does not form the collar loop being configured to slide through the ring, and wherein in the unlocked state the locking member is slidable relative to the second portion of the strap between the ring and the quick-release connector.

2. The animal leash according to claim 1 wherein the quick-release connector is located along the collar loop so that the collar loop comprises a portion of the first portion of the strap, a portion of the second portion of the strap, and the quick-release connector, and wherein the collar loop is located on an opposite side of the locking member than the first and second ends of the strap.

3. The animal leash according to claim 1 wherein the first end of the strap is coupled to a middle portion of the strap at a connection location to form a grip loop at a first end portion of the strap, wherein the grip loop is configured for insertion of a user's fingers to facilitate gripping of the animal leash.

4. The animal leash according to claim 3 wherein in the unlocked state the locking member is slidable relative to the first portion of the strap between the quick-release connector and the connection location, and wherein the locking member remains coupled to the first and second portions of the strap in both the locked and unlocked states.

5. The animal leash according to claim 1 wherein the strap is formed from a webbing material.

6. The animal leash according to claim 1 wherein the locking member is a cam buckle.

7. The animal leash according to claim 1 wherein the quick-release connector is located closer to the second end of the strap than to the first end of the strap, and wherein the quick-release connector is adjustable between: (1) a detached state in which the collar loop is open; and (2) an attached state in which the collar loop is closed.

8. An animal leash comprising:
a strap forming a first loop having a fixed size at a first end portion of the strap for gripping by a user and a second loop having an adjustable size at a second end portion of the strap for being placed around a portion of an animal to couple the strap to the animal;
a quick-release connector coupled to the strap along the second loop; and
a locking member coupled to the strap at a location that is between the first and second loops, the location of the locking member along the strap determining the size of the second loop, the locking member being alterable between: (1) a locked state in which the locking member cannot move relative to the strap and the size of the second loop cannot be adjusted; and (2) an unlocked state in which the locking member can move relative to the strap while remaining coupled to the strap to adjust the size of the second loop.

9. The animal leash according to claim 8 wherein the strap comprises a first portion extending between the quick-release buckle and a first end of the strap and a second portion extending between the quick-release buckle and a second end of the strap, the locking member being coupled to both of the first and second portions of the strap.

10. The animal leash according to claim 8 wherein the first loop has a diameter that is fixed in size such that the diameter cannot be increased or decreased, the first loop being formed by a first end of the strap being stitched to a middle portion of the strap.

11. The animal leash according to claim 8 wherein the strap comprises a first end that is stitched to a middle portion of the strap to form the first loop and a second end that is located external to each of the first and second loops, and further comprising a ring coupled to the second end of the strap, the first loop being configured to slide through the ring.

12. An animal leash comprising:
a first strap comprising a first end and a second end;
a second strap comprising a first end and a second end, the second strap being distinct from the first strap;
a quick-release connector coupled to the second end of the first strap and the first end of the second strap;
a locking member coupled to the first and second straps to form a collar loop that includes a portion of the first strap, a portion of the second strap, and the quick-release connector, the collar loop being configured to be coupled to an animal; and
wherein the locking member is alterable between: (1) a locked state in which a size of the collar loop is fixed; and (2) an unlocked state in which the first and second straps can slide relative to the locking member while the locking member remains coupled to the first and second straps to adjust the size of the collar loop; and
wherein a ratio of a length of the first strap to a length of the second strap is between 8:1 and 15:1, the quick-release connector being located closer to the second end of the second strap than to the first end of the first strap.

13. The animal leash according to claim 12 wherein the first strap comprises a first stopper that prevents the locking member from sliding past the first end of the first strap, and wherein the second strap comprises a second stopper that prevents the locking member from sliding past the second end of the second strap.

14. The animal leash according to claim 13 further comprising a ring coupled to the second end of the second strap, the ring forming the second stopper.

15. The animal leash according to claim 12 wherein the quick-release connector comprises a male portion coupled to one of the first and second straps and a female portion coupled to the other one of the first and second straps, and wherein the quick-release connector is alterable between: (1) an attached state in which the male and female portions are coupled together to couple the first strap to the second strap and form the collar loop; and (2) a detached state in which the male and female portions are separated from one another and the collar loop is open.

16. The animal leash according to claim 15 wherein when the quick-release connector is in the detached state, the first and second straps are coupled together solely by the locking member.

17. The animal leash according to claim 12 wherein a distal portion of the second strap that comprises the second end of the second strap is always located outside of the collar loop.

18. An animal leash comprising:
a first strap comprising a first end and a second end;
a second strap comprising a first end and a second end, the second strap being distinct from the first strap;
a quick-release connector coupled to the second end of the first strap and the first end of the second strap;
a locking member coupled to the first and second straps to form a collar loop that includes a portion of the first strap, a portion of the second strap, and the quick-release connector, the collar loop being configured to be coupled to an animal; and
wherein the locking member is alterable between: (1) a locked state in which a size of the collar loop is fixed; and (2) an unlocked state in which the first and second straps can slide relative to the locking member while the locking member remains coupled to the first and second straps to adjust the size of the collar loop;
wherein the first strap comprises a first stopper that prevents the locking member from sliding past the first end of the first strap, and wherein the second strap comprises a second stopper that prevents the locking member from sliding past the second end of the second strap; and wherein the first end of the first strap is stitched to the first strap at a connection location that is between the first and second ends of the first strap to form a grip loop having a fixed size, the connection location forming the first stopper.

* * * * *